United States Patent

Hauswirth et al.

Patent Number: 5,473,260
Date of Patent: Dec. 5, 1995

[54] METHOD AND CIRCUIT ARRANGEMENT FOR MEASURING THE DEPLETION LAYER TEMPERATURE OF A GTO THYRISTOR

[75] Inventors: Christian Hauswirth, Rüfenach, Switzerland; Gerhard Hochstuhl, Waldshut-Tiengen, Germany; Bruno Hofstetter, Brugg; Markus Keller, Luterbach, both of Switzerland

[73] Assignee: ABB Management AG, Baden, Switzerland

[21] Appl. No.: 280,797

[22] Filed: Jul. 26, 1994

[30] Foreign Application Priority Data

Jul. 26, 1993 [DE] Germany .................... 43 24 982.5

[51] Int. Cl.[6] .......................... G01R 31/26; H01L 29/743
[52] U.S. Cl. .......................... 324/766; 324/765; 327/512; 437/8
[58] Field of Search ..................... 324/719, 721, 324/765, 766, 767; 327/378, 512; 361/103; 437/8

[56] References Cited

U.S. PATENT DOCUMENTS

| | | | |
|---|---|---|---|
| 3,426,277 | 2/1969 | Carl et al. | 324/766 |
| 3,436,661 | 4/1969 | Gribbons | 324/766 |
| 3,745,460 | 7/1973 | Belzer et al. | 324/765 |
| 3,854,092 | 12/1974 | Tani et al. | 324/766 |
| 4,052,744 | 10/1977 | Boothman et al. | 361/103 |
| 4,056,776 | 11/1977 | Olsson et al. | 324/766 |
| 5,162,669 | 11/1992 | Hobelsberger | 327/512 |

FOREIGN PATENT DOCUMENTS

| | | |
|---|---|---|
| 2160485 | 12/1971 | Germany . |
| 3029655 | 8/1980 | Germany . |
| 600481 | 1/1975 | U.S.S.R. . |
| 1049755 | 11/1979 | U.S.S.R. . |

OTHER PUBLICATIONS

IEC Standardization Proposal 747-6 dated 1983, pp. 165-171.
Clemens Heumann et al., "Thyristoren Eigenschaften und Anwendungen", B. G. Teubner Stuttgart, 2. Aufl., 1970, pp. 23-29.

Primary Examiner—Kenneth A. Wieder
Assistant Examiner—Diep Do
Attorney, Agent, or Firm—Oblon, Spivak, McClelland, Maier & Neustadt

[57] ABSTRACT

A method and a circuit arrangement having a device for measuring the depletion layer temperature of a GTO are specified. In this case, a measurement current ($I_M$) is impressed in the gate circuit, and the voltage ($U_{GR}$) between the cathode and gate is measured, with an applied measurement current ($I_M$), after the transient turn-off processes have decayed. This voltage ($U_{GR}$) is at this time dependent on the depletion layer temperature of the GTO. It thus becomes possible to measure the depletion layer temperature directly on the element, that is to say without circuitous routes via a heat sink temperature and calculation of the thermal resistance or the like, and during operation, continuously, and in consequence to monitor and control the stress level on the GTO precisely.

9 Claims, 2 Drawing Sheets

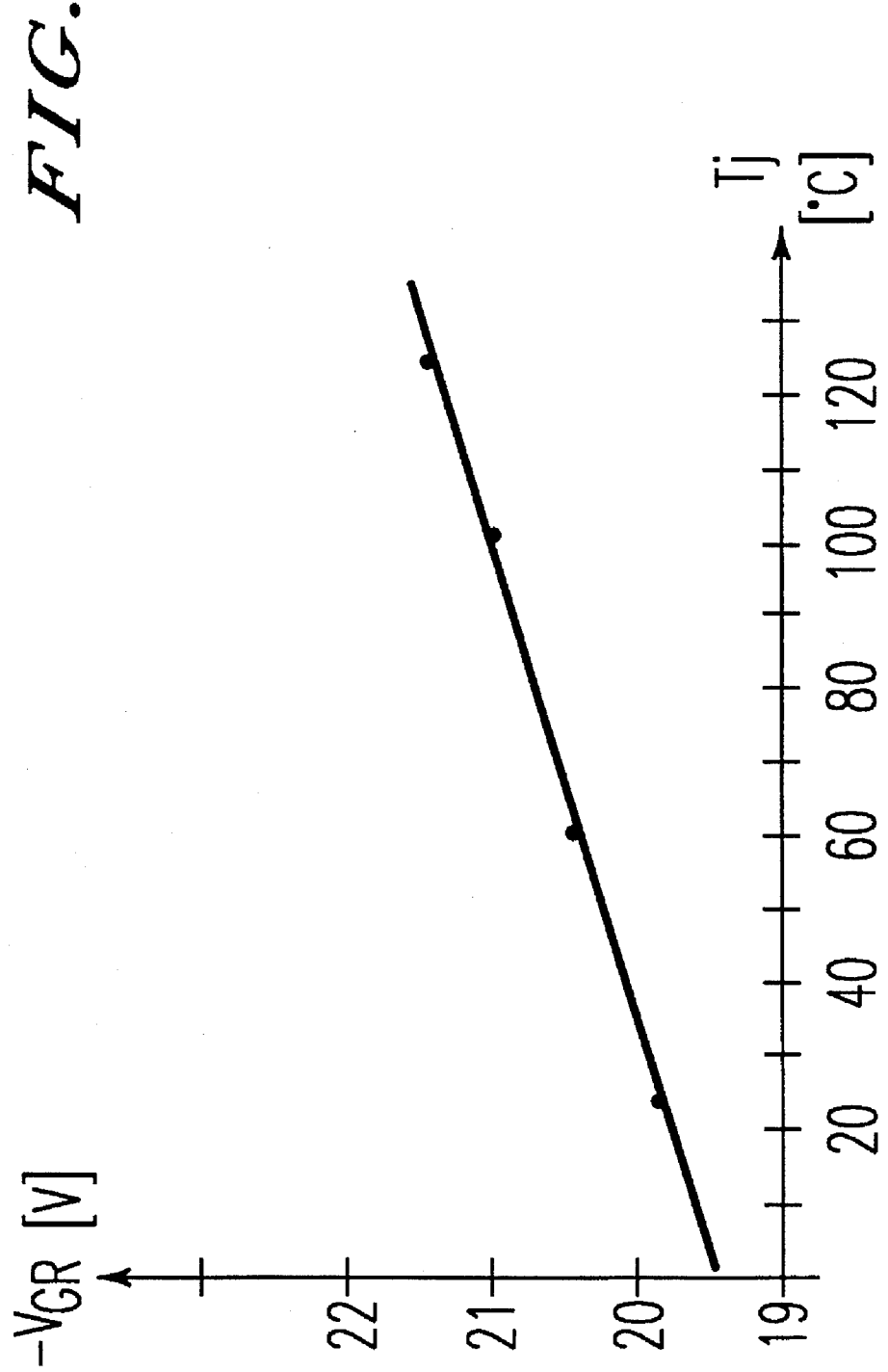

METHOD AND CIRCUIT ARRANGEMENT FOR MEASURING THE DEPLETION LAYER TEMPERATURE OF A GTO THYRISTOR

BACKGROUND OF THE INVENTION

1. Field of the Invention

The invention relates to the field of power electronics.

More specifically, this invention relates to a method for measuring the depletion layer temperature of a GTO thyristor. It is furthermore based on a circuit arrangement having at least one GTO whose gate and cathode are connected.

2. Discussion of Background

Various methods and devices for temperature measurement of GTOs are specified, for example, in IEC Standardization Proposal 747-6 dated 1983. It is common to these methods that the depletion layer temperature of the GTO can be calculated only via the circuitous route of the internal thermal resistance.

For this purpose, both this value and the temperature and power loss of the GTOs must be measured using additional measurement devices. However, the actual silicon temperature of the GTO can be deduced only approximately from the calculated values.

There is therefore always uncertainty on how highly thermally stressed the GTO actually is.

SUMMARY OF THE INVENTION

Accordingly, one object of the invention is to provide a novel method and circuit arrangement for measuring the depletion layer temperature of a GTO, it being intended that the measurement be possible directly on the GTO and during its operation.

This object is achieved by a method and a device of the type mentioned initially by means of the features in the first and fourth claim respectively.

The essence of the method according to the invention is thus for a measurement current to be impressed in the gate circuit during the switched-off phase of the GTO, and for voltage between the gate and cathode of the GTO to be measured after the switching-off control current has decayed. This voltage has a specific value, depending on the depletion layer temperature of the silicon. It is therefore possible to use this voltage measurement directly to deduce the depletion layer temperature of the GTO.

A preferred exemplary embodiment of this method is distinguished by the fact that a constant current of approximately 1 mA is impressed.

The essence of the circuit arrangement according to the invention is that a special device is provided which impresses a measurement current.

In a preferred exemplary embodiment, the device comprises a current source between the gate and the cathode of the GTO, and a device for measuring the voltage between the gate and cathode. The current source is in this case supplied from a supply voltage source, which is likewise arranged in the "gate-cathode" path.

The GTO is driven by a drive circuit comprising a switching-on circuit and a switching-off circuit. The device according to the invention is connected in parallel with the switching-off circuit. In order to achieve an electrical decoupling, a diode can be provided between the switching-off circuit and the device according to the invention.

Further exemplary embodiments result from the subclaims.

The advantages of the method and of the circuit arrangement according to the invention are, in particular, that it is possible to deduce the silicon depletion layer temperature of the GTO directly from the measured voltage. In addition, the measurement can be carried out during operation of the installation. In consequence, and since the measurement is carried out directly on the element, it is for the first time possible to control the stress of the GTO directly via the silicon temperature.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 shows the dependency of the measured voltage on the silicon depletion layer temperature of the GTO.

Figure 1:
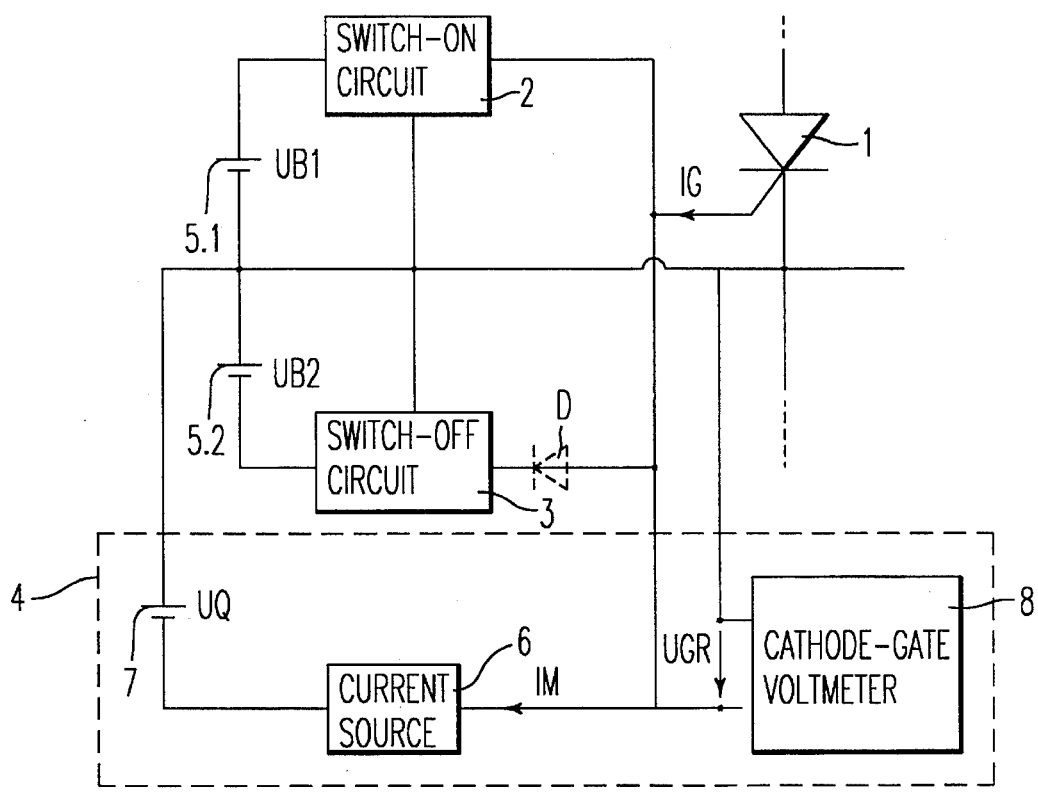
FIG. 1 shows a circuit arrangement according to the invention for measuring the depletion layer temperature of a GTO.

The reference symbols used in the drawings and their meaning are listed in summarized form in the list of designations.

DESCRIPTION OF THE PREFERRED EMBODIMENTS

Figure 2:
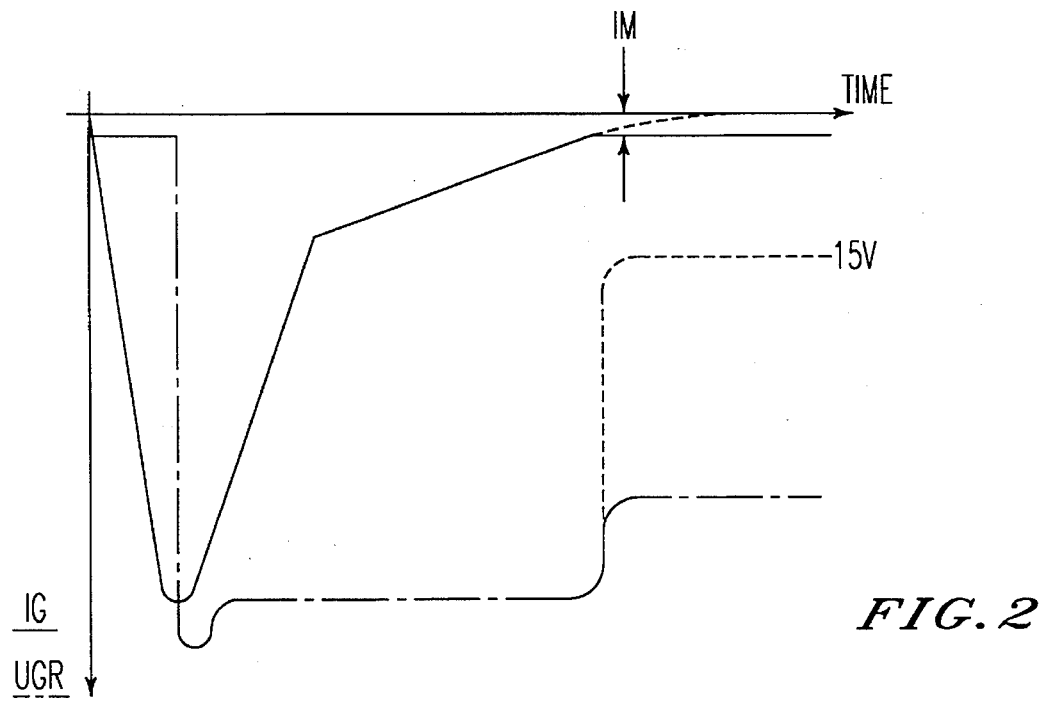
FIG. 2 shows the response of the gate current and of the voltage between the cathode and gate when the GTO is turned off, as a function of time.

Referring now to the drawings, wherein like reference numerals designate identical or corresponding parts throughout the several views, FIG. 2 shows the time response of the gate current and the voltage between the cathode and gate when a GTO is turned off. After turning off, the current ($I_G$) falls to zero (indicated by a dashed-dotted line). This behavior is well known and therefore requires no further explanations.

The voltage between the cathode and gate ($U_{GR}$) rises rapidly to the time of the gate current maximum, overshoots slightly and falls again once the current ($I_{GR}$) has fallen to zero. Normally, the voltage ($U_{GR}$) is subsequently externally held at a constant value of, for example, 15V (dotted voltage response).

According to the invention, a measurement current of ($I_M$) is now impressed in the gate circuit. In consequence, the current ($I_G$) no longer decays to zero, but remains at a value ($I_M$) after the turning-off process. In consequence, the response of the voltage ($U_{GR}$) also changes. It remains at a higher final value (dashed-dotted line).

As FIG. 3 shows, this final value of the voltage ($U_{GR}$) changes linearly with the measured depletion layer temperature of the GTO. A gradient of approximately 16.5 mV/K to 16.7 mV/K was measured in the test layer, using a measurement current of approximately 100 mA, depending on the GTO type. In consequence, it is possible to deduce the silicon depletion layer temperature of the GTO precisely and in a simple manner using the measured voltage.

The voltage is advantageously not measured until the transient turn-off processes have decayed. After this, the voltage has generally reached a steady-state value which is now dependent only on the depletion layer temperature.

FIG. 1 shows a circuit arrangement having a GTO (1), which is driven in a conventional manner, for example by a switching-on circuit (2) and a switching-off circuit (3). The GTO (1) may be, for example, part of an installation having a plurality of GTOs. The switching-on circuit (2) is responsible for triggering the GTO (1), and the switching-off circuit (3) for turning it off. The switching-on and off circuits (2, 3) are supplied from the supply voltage sources (5.1, 5.2). Both the switching-on circuit (2) and the switching-off circuit (3) are connected between the gate and cathode of the GTO. Their method of operation is known, subject to preconditions, and is not explained in more detail here.

The device (4) surrounded by a dashed line is essential to the invention. This device (4) allows the depletion layer temperature of the GTO to be measured in operation and in the installation to which the GTO belongs.

The device (4) is connected in parallel with the switching-on and switching-off circuits (2, 3) and essentially comprises a current source (6), a device (8) for measuring the cathode-gate voltage ($U_{GR}$) and a supply-voltage source (7) for supplying voltage to the current source (6).

Using this device (4), it is possible to impress the measurement current on the GTO thyristor and at the same time to measure the voltage ($U_{GR}$) between the cathode and gate of the GTO. In order to decouple the device (4) from the switching-off circuit (3) and to prevent the GTO triggering incorrectly as a result of large dU/dt values, a diode (D) can additionally be provided between the gate and the switching-off circuit (3).

As has been explained in the context of the method according to the invention, the current source emits, for example, a current ($I_M$) of approximately 100 mA, and the voltage ($U_{GR}$), is measured at a specific time after turning off. The only essential feature relating to the measurement time is that the voltage ($U_{GR}$) has reached a stable final value such that it now depends only on the measurement current ($I_M$) and on the depletion layer temperature of the GTO.

Using the method according to the invention and the device which is suitable for that purpose it is thus possible for the first time to measure the depletion layer temperature of the GTO directly on the element, without circuitous routes via, for example, measuring the heat sink temperature or the like, and, above all, also during operation. It is thus possible to control the installation as a function of the thermal stress on the GTOs.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letter Patent of the United States is:

1. A method for measuring the depletion layer temperature of a GTO thyristor having a cathode and a gate and which is used as a semiconductor switch in an installation comprising a load circuit having a load current and a gate circuit having a control current, whereby the load current is switched on and off by means of the GTO thyristor by applying the control current to the gate circuit, comprising the steps of:

impressing a measurement current on the gate which is small in comparison to the control current of the gate circuit;

measuring a cathode-gate voltage between the cathode and the gate of the GTO thyristor generated by the measurement current after the GTO thyristor has been turned off; and calculating the depletion layer temperature of the GTO thyristor from the cathode-gate voltage.

2. The method as claimed in claim 1, wherein said step of impressing includes the step of impressing a measurement current of approximately 100 mA.

3. The method as claimed in claim 1 wherein said step of impressing the measurement current includes the step of impressing the measurement current for a specific measurement time duration after the GTO thyristor has been turned off.

4. The method as claimed in claim 2, wherein said step of impressing the measurement current includes the step of impressing the measurement current for a specific measurement time duration once the GTO thyristor has been turned off.

5. A circuit arrangement comprising:

at least one GTO thyristor having a gate and a cathode;

a drive circuit comprising a switching-on circuit and a switching-off circuit which are each connected to said gate and said cathode;

the GTO thyristor being used as a semiconductor switch in an installation and having a load circuit with a load current and a gate circuit;

whereby the load current is switched on and off by means of the GTO thyristor by applying a control current to the gate circuit;

a current source is connected between the gate and the cathode of the GTO thyristor, by means of which current source a measurement current is impressed in the gate circuit; and a measurement device for measuring a cathode-gate voltage is connected between the gate and the cathode of the GTO thyristor.

6. The circuit arrangement as claimed in claim 5, wherein the measurement device measures the voltage between the cathode and the gate after the GTO thyristor has been turned off and as soon as the gate has fallen to the measurement current.

7. The circuit arrangement as claimed in claim 6, wherein the switching-on circuit and switching-off circuit and the current source are each supplied by separate voltage source.

8. The circuit arrangement as claim in claim 7, further comprising at least one diode which is arranged between the switching-off circuit and the gate of the GTO thyristor, said diode decoupling the measurement device from the switching-off circuit.

9. The circuit arrangement as claimed in claim 8, wherein the current source emits a current of approximately 100 mA.

* * * * *